United States Patent
Yang

(10) Patent No.: US 8,897,030 B2
(45) Date of Patent: Nov. 25, 2014

(54) EXPANSION APPARATUS WITH SERIAL ADVANCED TECHNOLOGY ATTACHMENT DUAL IN-LINE MEMORY MODULE DEVICE

(71) Applicants: Hong Fu Jin Precision Industry (ShenZhen) Co., Ltd., Shenzhen (CN); Hon Hai Precision Industry Co., Ltd., New Taipei (TW)

(72) Inventor: Meng-Liang Yang, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/802,920

(22) Filed: Mar. 14, 2013

(65) Prior Publication Data

US 2014/0177195 A1 Jun. 26, 2014

(30) Foreign Application Priority Data

Dec. 26, 2012 (CN) .......................... 2012 1 0573653

(51) Int. Cl.
| | |
|---|---|
| *H05K 1/11* | (2006.01) |
| *H05K 1/14* | (2006.01) |
| *G06F 1/16* | (2006.01) |
| *H05K 5/00* | (2006.01) |
| *H05K 7/00* | (2006.01) |

(52) U.S. Cl.
CPC ..................................... *H05K 1/141* (2013.01)

USPC . 361/785; 361/784; 361/679.31; 361/679.32; 361/791; 361/792

(58) Field of Classification Search
USPC ............... 361/679.31, 679.32, 728, 729, 735, 361/736, 784, 785, 788, 790, 791, 792, 794
See application file for complete search history.

(56) References Cited

U.S. PATENT DOCUMENTS

| | | | |
|---|---|---|---|
| 2009/0063895 A1* | 3/2009 | Smith | 714/7 |
| 2010/0049914 A1* | 2/2010 | Goodwin | 711/114 |

* cited by examiner

*Primary Examiner* — Hoa C Nguyen
*Assistant Examiner* — Binh Tran
(74) *Attorney, Agent, or Firm* — Novak Druce Connolly Bove + Quigg LLP

(57) ABSTRACT

An expansion apparatus includes a first connector having first power pins and first signal pins, and a second connector having second power pins and second signal pins. A power circuit is connected to the first and second power pins. A serial advanced technology attachment (SATA) expansion controller is connected to the first and second signal pins. First control chips are connected to the SATA expansion controller and the power circuit. First storage chips are connected to the first control chips and the power circuit. A third connector has third power pins corresponding to second power pins, and third signal pins corresponding to second signal pins. Second control chips are connected to the third power pins and the third signal pins. Second storage chips are connected to the second control chips and the third power pins.

3 Claims, 1 Drawing Sheet

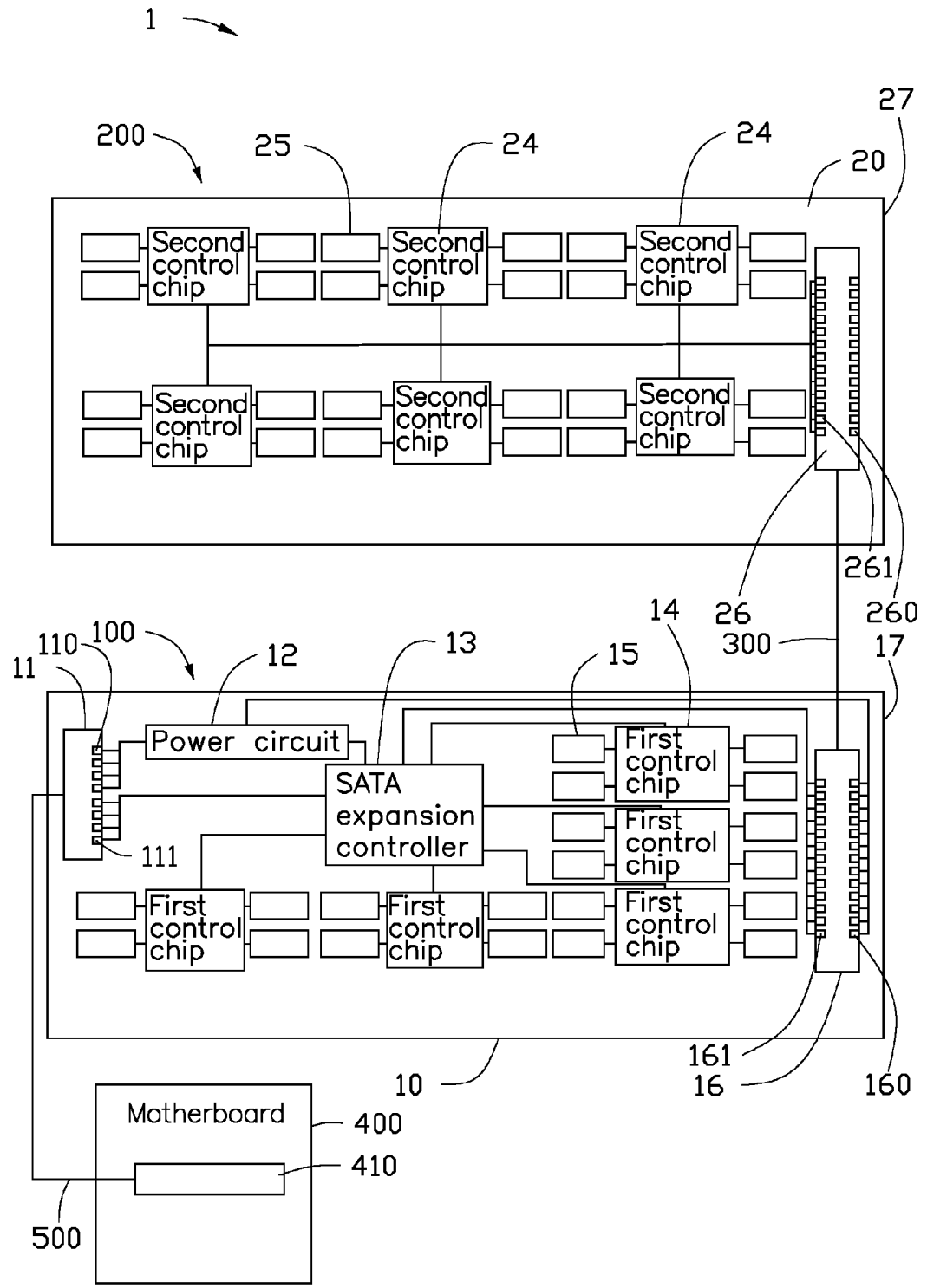

EXPANSION APPARATUS WITH SERIAL ADVANCED TECHNOLOGY ATTACHMENT DUAL IN-LINE MEMORY MODULE DEVICE

BACKGROUND

1. Technical Field

The present disclosure relates to an expansion apparatus with a serial advanced technology attachment dual in-line memory module (SATA DIMM) device.

2. Description of Related Art

At present, SATA DIMMs can be used for adding storage capacity to a blade server, expanding the system space of the blade server. However, the number of storage chips arranged on the SATA DIMM is limited, and each SATA DIMM device needs a power interface and a SATA connector for connecting a corresponding power interface and a corresponding SATA connector, to communicate with the motherboard. The limit of storage chips reduces the storage capacity, and the power interface and the SATA connector occupies a lot of space of the SATA DIMM device. Therefore, there is room for improvement in the art.

BRIEF DESCRIPTION OF THE DRAWING

Many aspects of the embodiments can be better understood with reference to the following drawing. The components in the drawing are not necessarily drawn to scale, the emphasis instead being placed upon clearly illustrating the principles of the present embodiments.

The FIGURE is a schematic diagram of an expansion apparatus with serial a advanced technology attachment dual in-line memory module device in accordance with an embodiment of the present disclosure.

DETAILED DESCRIPTION

The disclosure, including the drawing, is illustrated by way of example and not by way of limitation. References to "an" or "one" embodiment in this disclosure are not necessarily to the same embodiment, and such references mean at least one.

The FIGURE shows an expansion apparatus of one embodiment. The expansion apparatus 1 includes a first expansion card 100 and a second expansion card 200.

The first expansion card 100 includes a substantially rectangular circuit board 10. A first connector 11, a power circuit 12, a serial advanced technology attachment (SATA) expansion controller 13, a plurality of first control chips 14, a plurality of first storage chips 15, and a second connector 16 are all arranged on the circuit board 10. The first and second connectors 11 and 16 are arranged on two opposite ends 17 of the circuit board 10. Each first control chip 14 is connected to four first storage chips 15. The first connector 11 includes a plurality of power pins 110 and a plurality of signal pins 111. The second connector 16 includes a plurality of power pins 160 and a plurality of signal pins 161. The power circuit 12 is connected to the power pins 110, the SATA expansion controller 13, the first control chips 14, the first storage chips 15, and the power pins 160. The SATA expansion controller 13 is connected to the signal pins 111 and 161, and the first control chips 14. The first connector 11 is also connected to a corresponding connector 410 of a motherboard 400 through a cable 500, to transmit a voltage received from the motherboard 400 to the power circuit 12 through the power pins 110 and transmit a SATA signal received from the motherboard 400 to the SATA expansion controller 13 through the signal pins 111. The SATA expansion controller 13 divides the received SATA signal into a plurality of SATA signals.

The second expansion card 200 includes a substantially rectangular circuit board 20. A third connector 26, a plurality of second control chips 24, and a plurality of second storage chips 25 are all arranged on the circuit board 20. Each second control chip 24 is connected to four second storage chips 25. The third connector 26 is arranged on an end 27 of the circuit board 20 and connected to the second connector 16 of the circuit board 10 through a cable 300. The third connector 26 includes a plurality of power pins 260 corresponding to the power pins 160, and a plurality of signal pins 261 corresponding to the signal pins 161. The power pins 260 are connected to the second control chips 24 and the second storage chips 25. The signal pins 261 are connected to the second control chips 24.

In use, the second connector 16 of the first expansion card 100 is connected to the third connector 26 of the second expansion card 200 through the cable 300. The first connector 11 of the first expansion card 100 is connected to the connector 410 of the motherboard 400 through the cable 500. Powering on the motherboard 400 provides a voltage to the power circuit 12 of the first expansion card 100 through the connector 410 and the power pins 110 of the first connector 11. The power circuit 12 converts the received voltage and provides the converted voltage to the SATA expansion controller 13, the first control chips 14, and the first storage chips 15. The power circuit 12 also provides the converted voltage to the second control chips 24 and the second storage chips 25 through the power pins 160 and 260. At the same time, the motherboard 400 outputs a SATA signal to the SATA expansion controller 13 of the first expansion card 100 through the connector 410 and the signal pins 111 of the first connector 11. The SATA expansion controller 13 divides the received SATA signal into a plurality of SATA signals, and provides one of the SATA signals to one of the first control chips 14. The SATA expansion controller 13 also provides one of the SATA signals to one of the second control chips 24 through the signal pins 161 and 261. The first control chips 14 control the corresponding first storage chips 15 to store data according to the received SATA signals. The second control chips 24 control the corresponding second storage chips 25 to store data according to the received SATA signals.

The expansion apparatus 1 receives a voltage and a SATA signal from the motherboard 400 through the connector 410 and the first connector 11, the SATA expansion controller 13 divides the received SATA signal into a plurality of SATA signals and provides the SATA signals to the first and second control chips 14 and 24. The first and second control chips 14 and 24 control the first and second storage chips 15 and 25 to store data. The expansion apparatus 1 can expand storage capacity and avoid using power interfaces and SATA connectors for saving space.

Even though numerous characteristics and advantages of the disclosure have been set forth in the foregoing description, together with details of the structure and function of the disclosure, the disclosure is illustrative only, and changes may be made in detail, especially in the matters of shape, size, and arrangement of parts within the principles of the disclosure to the full extent indicated by the broad general meaning of the terms in which the appended claims are expressed.

What is claimed is:

1. An expansion apparatus, comprising:
  a first expansion card comprising:
    a first circuit board;
    a first connector arranged on the first circuit board and connected to a corresponding connector of a motherboard, wherein the first connector comprising a plurality of first power pins and a plurality of first signal pins;
a power circuit arranged on the first circuit board and connected to the plurality of first power pins of the first connector;
a serial advanced technology attachment (SATA) expansion controller arranged on the first circuit board, and connected to the plurality of first signal pins of the first connector and the power circuit;
a plurality of first control chips arranged on the first circuit board, and connected to the SATA expansion controller and the power circuit;
a plurality of first storage chips arranged on the first circuit board, and connected to the plurality of first control chips and the power circuit; and
a second connector arranged on the first circuit board, wherein the second connector comprises a plurality of second power pins connected to the power circuit and a plurality of second signal pins connected to the SATA expansion controller; and a second expansion card comprising:
a second circuit board;
a third connector arranged on the second circuit board and connected to the second connector, wherein the third connector comprises a plurality of third power pins corresponding to the plurality of second power pins, and a plurality of third signal pins corresponding to the plurality of second signal pins;
a plurality of second control chips arranged on the second circuit board and connected to the plurality of third power pins and the plurality of third signal pins; and
a plurality of second storage chips arranged on the second circuit board, and connected to the plurality of second control chips and the plurality of third power pins;

wherein the first connector transmits a voltage received from the motherboard to the power circuit through the plurality of first power pins and transmits a SATA signal received from the motherboard to the SATA expansion controller through the plurality of first signal pins, the power circuit converts the received voltage and provides the converted voltage to the plurality of first control chips and the plurality of first storage chips, and also provides the converted voltage to the plurality of second control chips and the plurality of second storage chips through the plurality of second and third power pins, the SATA expansion controller divides the received SATA signal into a plurality of SATA signals and provides the plurality of SATA signals to the plurality of first control chips to control the plurality of first storage chips to store data, and also provides the plurality of SATA signals to the plurality of second control chips through the plurality of second and third signal pins to control the plurality of second storage chips to store data.

2. The expansion apparatus of claim 1, wherein the first and second connectors are arranged on two opposite ends of the first circuit board, the third connector is arranged on an end of the second circuit board.

3. The expansion apparatus of claim 1, wherein each of the plurality of first control chips is connected to four first storage chips, each of the plurality of second control chips is connected to four second storage chips.

* * * * *